(12) United States Patent
Schopf

(10) Patent No.: US 6,952,885 B2
(45) Date of Patent: Oct. 11, 2005

(54) STYLUS AND A METHOD OF FORMING SAME

(75) Inventor: Reinhold Schopf, Trostberg (DE)

(73) Assignee: Dr. Johannes-Heidenhain GmbH, Traunreut (DE)

(*) Notice: Subject to any disclaimer, the term of this patent is extended or adjusted under 35 U.S.C. 154(b) by 644 days.

(21) Appl. No.: 09/928,070

(22) Filed: Aug. 10, 2001

(65) Prior Publication Data
US 2002/0066198 A1 Jun. 6, 2002

(30) Foreign Application Priority Data
Aug. 31, 2000 (DE) .......................... 100 42 715

(51) Int. Cl.⁷ .................................. G01B 5/00
(52) U.S. Cl. .............................. 33/559; 33/556
(58) Field of Search .............. 33/556–562; 411/1–5, 411/10, 15; 148/525, 595, 639; 225/2, 96.5, 93.5, 94.5, 93; 405/259.5

(56) References Cited

U.S. PATENT DOCUMENTS

| | | | |
|---|---|---|---|
| 4,556,351 A | * 12/1985 | Wollar et al. | ............ 411/38 |
| 4,752,169 A | * 6/1988 | Pratt | ............ 411/43 |
| 4,826,372 A | * 5/1989 | Kendall | ............ 411/43 |
| 5,299,360 A | * 4/1994 | Possati et al. | ............ 33/559 |
| 5,321,895 A | * 6/1994 | Dubois-Dunilac et al. | ..... 33/556 |
| 5,355,589 A | * 10/1994 | Madlener et al. | ............ 33/561 |
| 5,404,649 A | * 4/1995 | Hajdukiewicz et al. | ....... 33/556 |
| 5,480,121 A | * 1/1996 | Rice et al. | ............ 248/548 |
| 5,707,181 A | 1/1998 | von Allmen et al. | |
| 5,988,598 A | * 11/1999 | Sicking et al. | ............ 256/13.1 |
| 6,113,055 A | * 9/2000 | Salman | ............ 248/548 |
| 6,516,573 B1 | * 2/2003 | Farrell et al. | ............ 52/98 |

FOREIGN PATENT DOCUMENTS

| | | | | |
|---|---|---|---|---|
| DE | 3314318 | | 10/1984 | |
| DE | 4100323 | | 7/1992 | |
| DE | 4128105 | | 2/1993 | |
| DE | 4217641 | | 12/1993 | |
| JP | 2001232420 A | * | 8/2001 | ........... B21D/7/025 |

* cited by examiner

Primary Examiner—Christopher W. Fulton
Assistant Examiner—Yaritza Guadalupe
(74) Attorney, Agent, or Firm—Abelman, Frayne & Schwab

(57) ABSTRACT

A stylus including a stem, and a break-off region provided in the stem and consisting of a changed structure of a stem material, and a method of forming the stylus according to which the change of the structure of a stem material is effected by heat treatment of a region of the stem in which the break-off region is to be provided.

6 Claims, 2 Drawing Sheets

STYLUS AND A METHOD OF FORMING SAME

BACKGROUND OF THE INVENTION

1. Field of the Invention

The present invention relates to a stylus, in particular, to a stylus for a coordinate-measuring machine and having a stem with a break-off point. The present invention also relates to a method of forming a stylus with a break-off point, and to a coordinate-measuring machine having a stylus with a break-off point.

2. Description of the Prior Art

As known, styluses are used in coordinate-measuring machines which perform different measuring tasks from a simple measurement of a distance between two spaced from each other objects to a measurement of the three-dimensional surfaces.

A stylus, which is usually used in coordinate-measuring machines, usually has a cylindrical stem formed of steel or ceramics and at one end of which, a mechanical touch element is attached, mostly, in a form of a ground ruby ball having a predetermined radius. The touch element is used for taking measurements of a specimen. The other end of the stem is connected with the touch probe which, on one hand, provides for displacement of the stylus and, on the other hand, contain sensors for determining the stylus displacements.

Coordinate-measuring machines can be divided in different groups. The first group includes linear measuring systems which output a position of a stylus, which is displaced in a measuring direction, as a measurement value.

The linear measurement systems permit to conduct simple distance measurements or obtain a height profile of a workpiece movable relative to the stylus.

The second group includes coordinate-measuring machines having a resiliently biased stylus that can be deflected in any direction. These so-called three-dimensional measurement systems function based on different principles.

Three-dimensional systems can include linear and rotary encoders which completely determine the deviation of the stylus and, thereby, provide for determination of coordinates of the touch element. These machines are designated as measuring touch systems. They insure determination of measurement values with a statical or dynamic operation, i.e., specimen and the touch element can, at the time of the acquisition of a measurement value, remain stationary with respect to each other or displace relative to each other.

Also known are so-called switching touch systems. With these systems, a trigger signal is generated at a predetermined deviation of the stylus. The signal is transmitted to a control unit which then receives coordinates from an available measuring system, e.g., of a machine tool. The switching systems operate only dynamically. After generation of the measurement signal, the displacement of the specimen or the touch system should be stopped in order that the maximum allowable deviation of the stylus is not exceeded.

It is not a trivial object to determine, in all cases, based on a position of the stylus, with a touch probe, the coordinates of the measurement point, i.e., the contact point of the touch element with the specimen. For the determination of coordinates, the measurement direction, deflection of the stylus, geometry of the touch element, and direction of the surface perpendicular of the specimen in the measurement point, all need be considered. The discussion of the coordinate determination can be found in an article of T. Pfeifer and A vom Hemdt "Berechung der Basiselemente und die Tasterkompensation in der koordinatenmesstechnik (Calculation of Basic Elements and Stylus Compensation)" published in a magazine "Technisches Messen (Technical Measurements)" 5/90, published by R. Oldenbourg Verlag.

Flexural characteristics, i.e., flexural strength of the stylus, also play an important role in the quality of the measurement with a coordinate-measuring machine.

In order to prevent damage of the sensitive mechanics or of the measuring system in the touch probe in case of an uncontrolled collision of the stylus with the specimen or other parts, it is desirable to provide the stylus with a predetermined break-off region that would prevent transmission of a large force.

German Publication DE 33 14 318 discloses a coordinate-measuring machine including an inductive measurement system that can determine a position of a stylus in one direction. The predetermined break-off region is obtained by a noticeable reduction of the cross-section of the stylus stem. The predetermined break-off region should protect this unidimensional measuring system against a large load acting transverse to the measurement direction. In this case, a particularly high flexural strength of the stylus is not required as bending of the stylus in a direction transverse to the measuring direction only slightly influences the measurement.

An object of the present invention is to provide a stylus having a predetermined break-off region and which can be economically produced and the flexural strength of which is not reduced at all or is reduced only insignificantly by the break-off region.

Another object of the present invention is to provide a cost-effective method of producing a stylus having a predetermined break-off region and which would not affect or affect only insignificantly the flexural strength of the stylus.

A further object of the present invention is to provide a coordinate-measuring machine having a stylus with a break-off region and which can be economically produced and the flexural strength of which is not affected or is affected only insignificantly by the manufacturing process of forming the break-off region.

SUMMARY OF THE INVENTION

These and other objects of the present invention, which will become apparent hereinafter are achieved by providing a stylus having a stem with a break-off region consisting of a changed structure of the stem material, by providing a method with which the break-off region is formed and according to which the changing of the structure of the stem material in a stem region in which the break-off region is to be formed, is effected by heating the respective stem region without any substantial removal of the material, and by providing a coordinate-measuring machine having a stylus the break-off region of which is formed by a changed structure of the stylus stem material.

According to the present invention, the stylus stem includes, as it has been discussed above, a region with a changed structure in which in case of application of mechanical load, local stresses are generated which lead to breaking of the stylus with a reduced force.

Advantageously, the changing of the structure in the break-off region is effected with heating the predetermined stem region with a laser beam. The fineness of the obtained structure and the fact that no or almost no material is removed insure that the flexural characteristics of the stylus, and thereby, the measurement characteristics remain unchanged or are changed only insignificantly.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
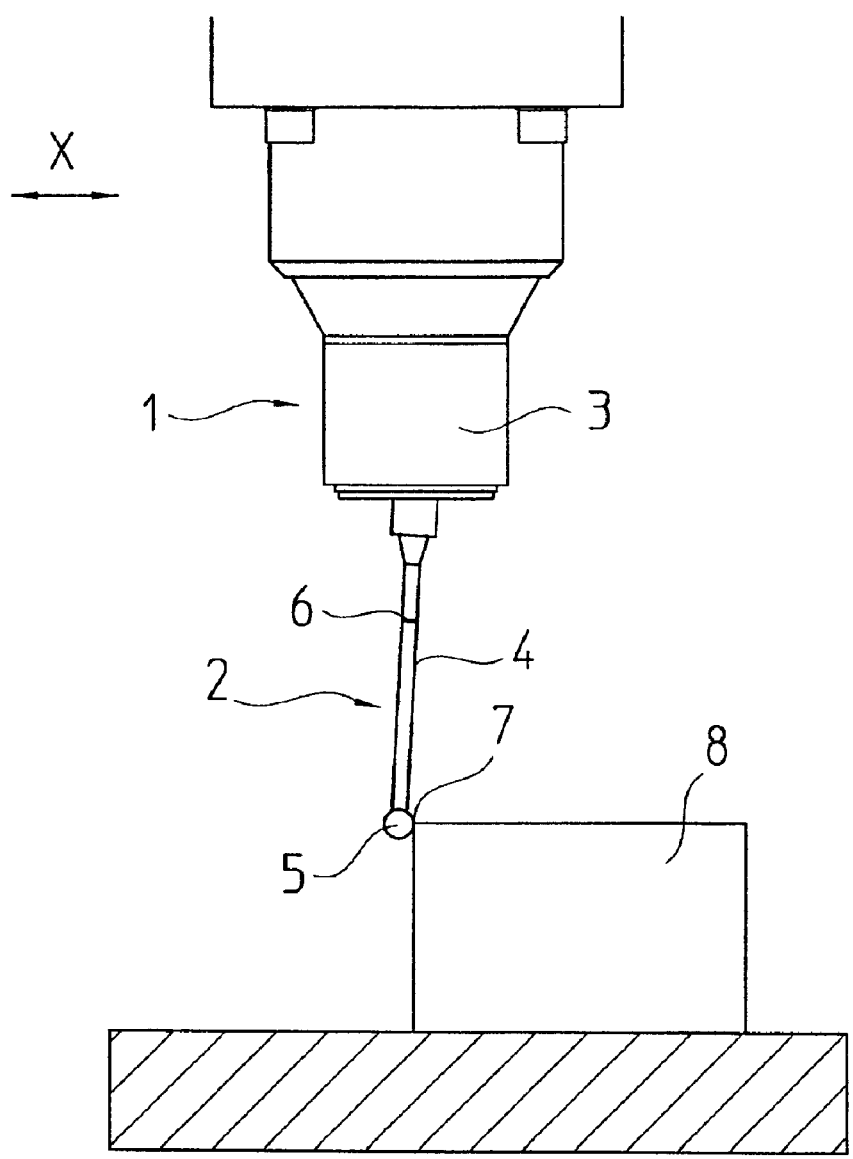
FIG. 1 a schematic view of a coordinate-measuring machine.

A coordinate-measuring machine 1, which is shown in FIG. 1, has a stylus 2, and a touch probe 3. The stylus 2 has a stem 4, which is formed of a hard metal, and a touch element 5 in a form of a ruby ball. The stem 4 has a predetermined break-off point 6 that consists of a region the structure of material of which has been changed by heat treatment of the hard metal the stem 4 is made of. The touch probe 3 includes a device that provides for movement of the touch element 5 in all directions and permits to calculate a measurement point 7 between the touch element 5 and a specimen 8 based on a measurement direction X and a position of the stylus 2.

Figure 2:
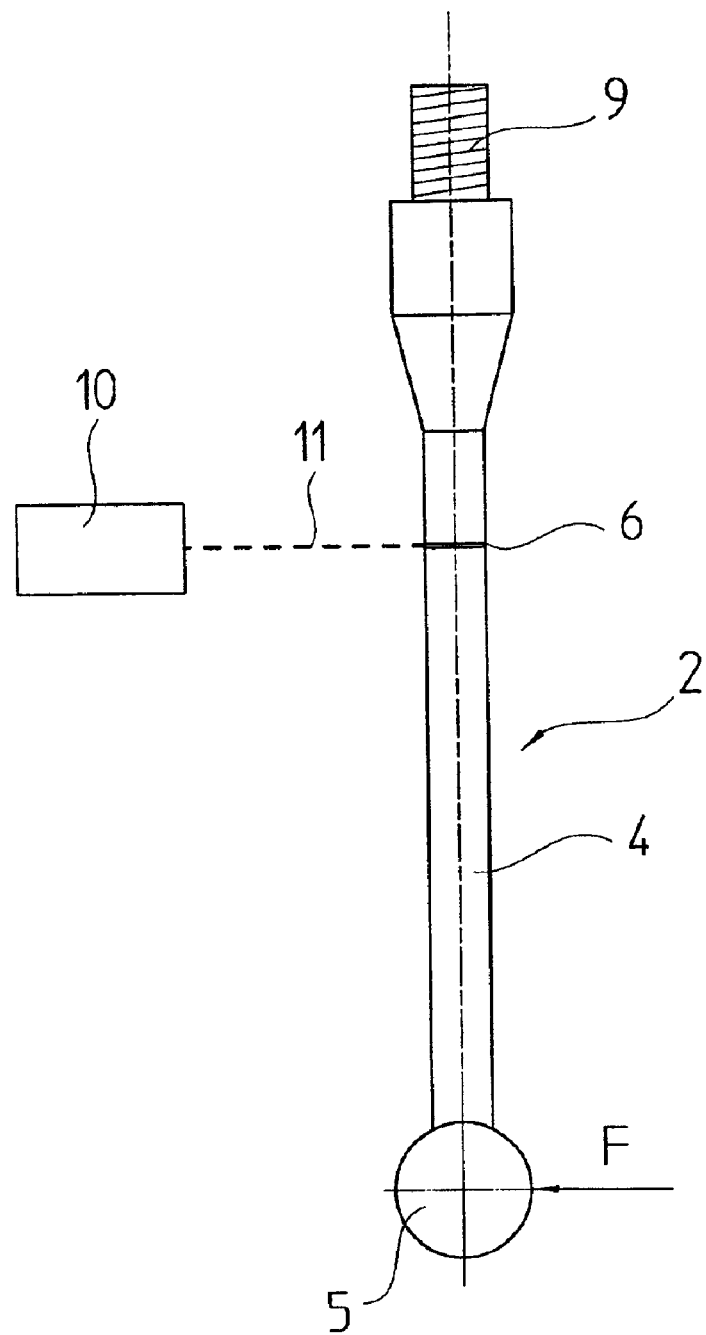
FIG. 2 a front elevational view of a stylus with a predetermined breaking point.

FIG. 2, as discussed above, shows the stylus 2 according to the present invention for use with a coordinate-measuring machine. The inventive stylus 2 includes a stem 4, a touch element 5, a predetermined break-off point 6, and a thread 9 with which the stylus 2 is secured in the touch probe.

The predetermined break-off point 6 is obtained when the stem 4 of the stylus 2 is subjected to a local heating with a tunable nd-yag (neodym-yttrium-aluminum-granat) laser 10. The diameter of a laser beam 11 is, e.g., so selected that the heating region of the stem 4 has a width of about 0.25 mm. As the measurement characteristic of the cylindrical stylus 2 transverse to a measurement direction should be the same in all directions, the stem 4 is irradiated along its entire circumference. The intensity of the laser beam 11 and the irradiation duration should be such that, e.g., a structural change up to a depth of about 0.2 mm in the volume of the stem 4 is achieved. Because no removal of material or a minimal removal of material occurs, the diameter of the stem would not change or would change only insignificantly. E.g., for the stem 4 formed of a hard metal and having a diameter 2 mm and a distance between the predetermined break-off point 6 and the touch element 5 of about 30 mm, the break-off force F is reduced to about 20 N in comparison with the breaking force of 60 N for an identical stylus but without a predetermined break-off point. With application of a load in the direction of the stylus, the predetermined break-off point 6 permits to reduce the break-off force from about 900 N to about 650 N.

The reduction of the break-off force F results from the local tension in the changed material structure in the region of the predetermined break-off point. Upon application of the break-off force F, the local tension, which is produced in the region of the predetermined break-off point, is noticeably greater than the tension in the material without a break-off point.

The advantage of the present invention, as described above, consists in that the break-off point is clearly visible, and clear differences between styluses with and without a break-off point exist.

According to a further embodiment of the present invention, it is possible to provide an adaptation member with a predetermined break-off point of the type described above. Such an adaptation member is generally screwed in between the stylus and the touch probe or between the touch element and the stem.

For the heat treatment and for changing the material structure of the stem 4, not only laser irradiation can be used. Rather, all forms of high-energy irradiation, which have the necessary intensity and focusing, can be used. The stem 4 can be made not only of a hard metal. Also, the shape of the predetermined break-off point 6 can be adapted to existing conditions. Thus, when appropriate, instead of irradiation of the entire circumference of the stem 4 in the region of the predetermined break-off point 6, only separate regions of the circumference can be irradiated. Alternatively, components, which have a preferential break-off direction, can be used.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A stylus, comprising a stem; and a break-off region provided in the stem and consisting of a changed structure of a stem material, wherein a diameter of the stem in the break-off region remains substantially unchanged.

2. A stylus as set forth in claim 1, wherein the break-off region is formed along a circumference of the stem.

3. A stylus as set forth in claim 1, where in the stem is formed of a hard metal.

4. A coordinate-measuring machine, comprising a touch probe; and a stylus connectable to the touch probe and including a stem, and a break-off region provided in the stem and consisting of a changed structure of a stem material wherein a diameter of the stem in the break-off region remains substantially unchanged.

5. A machine as set forth in claim 4, wherein the break-off region is formed along a circumference of the stem.

6. A machine set forth in claim 4, wherein the stem is formed of a hard metal.

* * * * *